Patented Oct. 27, 1942

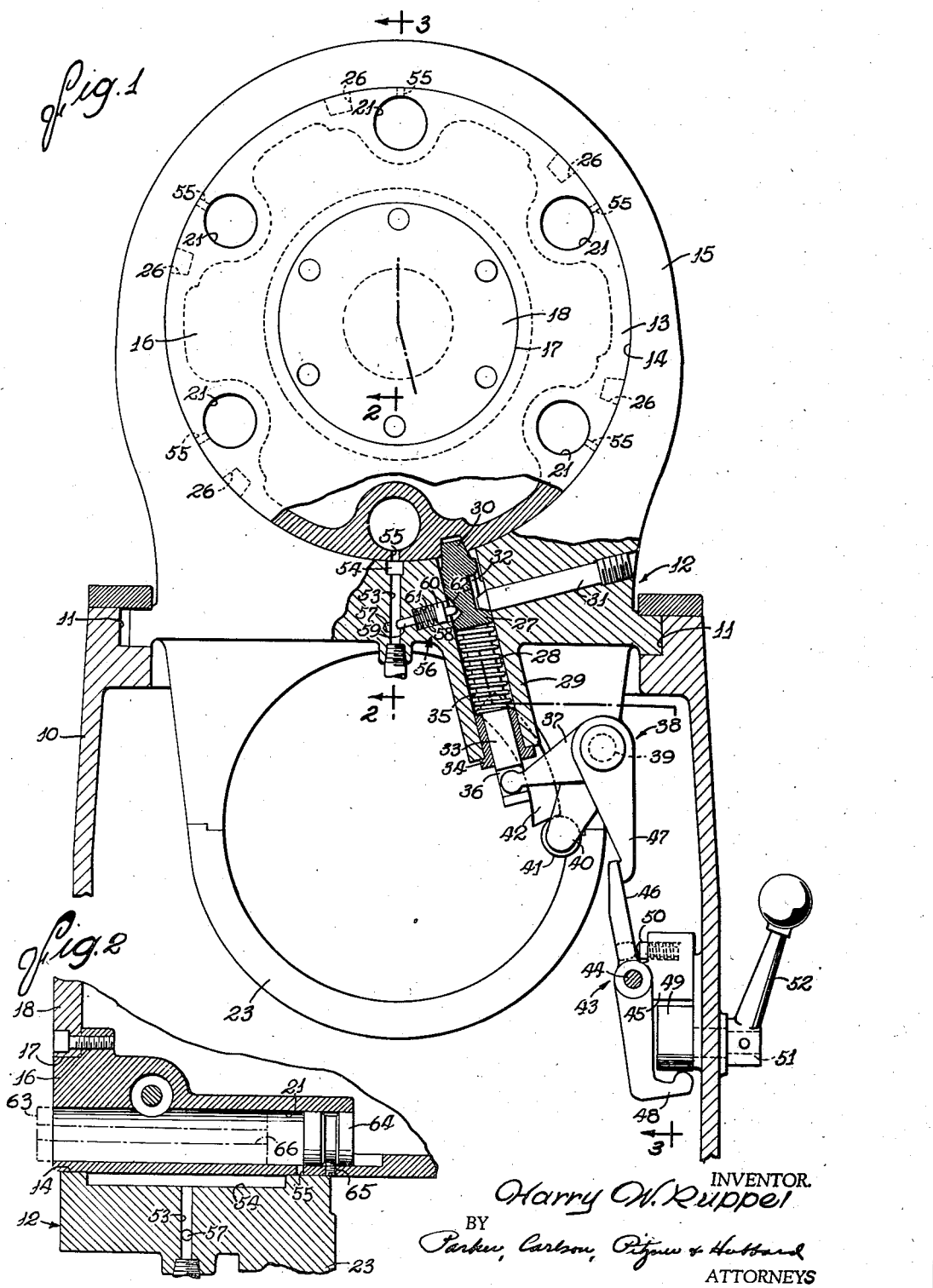

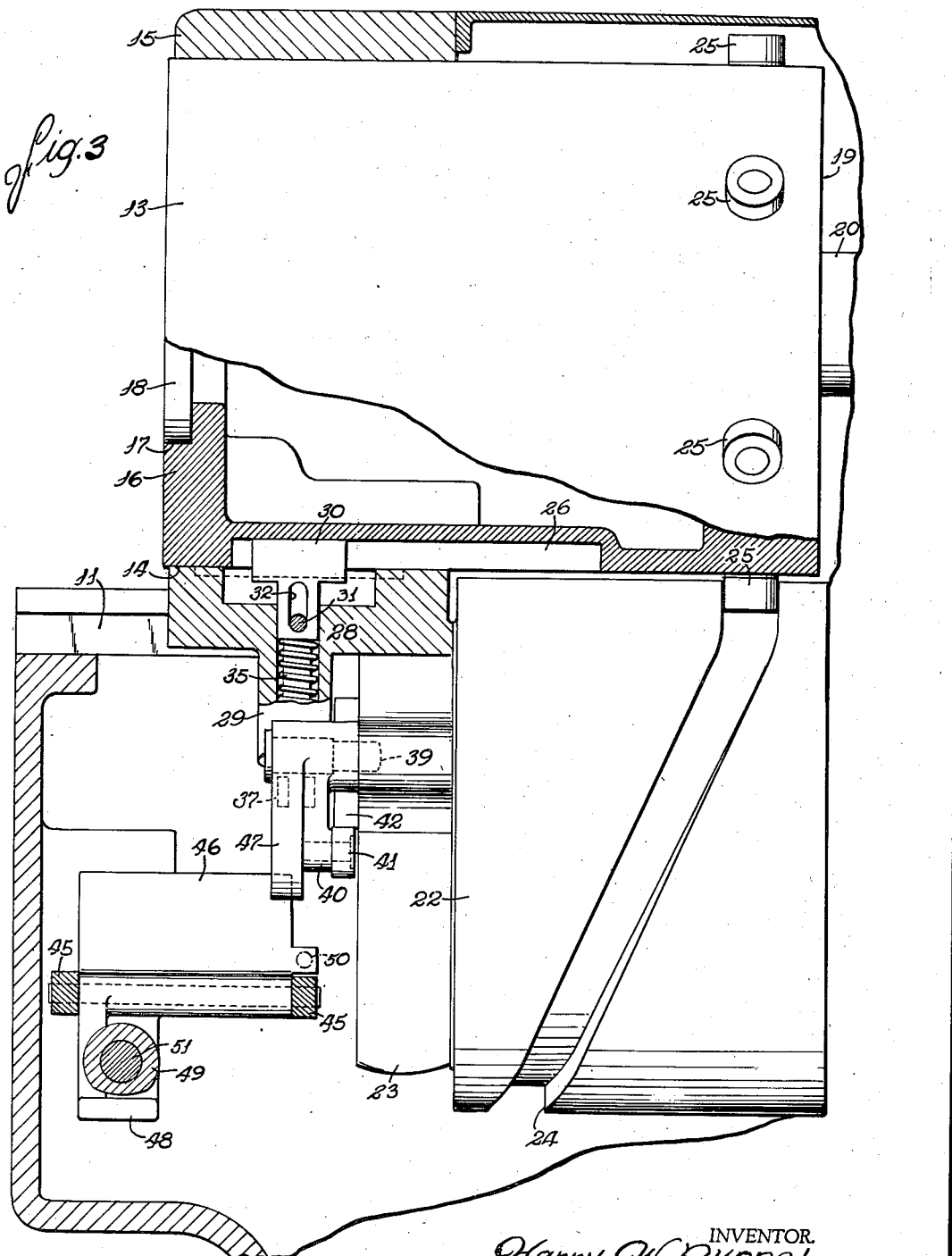

2,300,389

UNITED STATES PATENT OFFICE 2,300,389

COOLANT CONTROL AND LOCK FOR SPINDLE TURRETS

Harry W. Ruppel, Cleveland, Ohio, assignor to The Foote-Burt Company, Cleveland, Ohio, a corporation of Ohio Application May 11, 1940, Serial No. 334,624

13 Claims. (Cl. 29—43)

The present invention relates to improvements in multiple spindle turrets adapted to be intermittently rotated to index successive spindles into a working station, and to be translated axially between successive indexing movements, and has particular reference to means for controlling the supply of a coolant to the spindles and means for locking the turret in each indexed position.

One of the objects of the present invention is to provide novel means for automatically connecting each spindle, as it is moved into the working station, to a coolant supply passage, said means including a valve operable both automatically and manually to control the passage.

Another object is to provide a new and improved coolant control valve operable to cut off the supply of coolant during each indexing movement of the turret, and to connect the coolant supply while the turret is in indexed position.

A further object is to provide novel means for automatically locking the turret in each indexed position, and operable to close the coolant control valve when the turret is released, and to open the valve when the turret is locked.

Other objects and advantages will become apparent as the description proceeds.

In the accompanying drawings, Figure 1 is a fragmentary sectional view of a spindle turret including a coolant control and index lock embodying the features of my invention.

Fig. 2 is a fragmentary sectional view taken substantially along line 2—2 of Fig. 1.

Fig. 3 is a fragmentary sectional view taken substantially along line 3—3 of Fig. 1.

The turret, which is herein disclosed for purposes of illustration, is adapted for use in an automatic screw machine of the type wherein a plurality of tools are indexed successively into a working station and are advanced and retracted to perform a series of cutting operations on a work blank. Such blank may consist of a bar of stock which is fed intermittently through a hollow work spindle and clamped in an automatic chuck for engagement by the cutting tools.

Referring more particularly to the drawings, the machine comprises a frame 10 formed on the top with parallel spaced ways 11 supporting a slide 12. A hollow cylindrical turret 13 is mounted for rotation and axial reciprocation in a bore 14 of a turret housing 15 integral with the slide 12.

Both ends of the turret 13 are closed, the outer end wall 16 having an axial opening 17 normally closed by a removable plate 18 and through which access to the interior may be had, and the inner end wall 19 being connected to an axially extending index shaft 20. Formed in the forward end of the turret 13 are a plurality of parallel holes 21 located in uniformly spaced relation about the axis of rotation, and adapted to receive and support the shanks of the tools. These holes are defined by tubular enlargements formed on the inner periphery of the turret 13, and open to the outer end face of the wall 16. It will be understood that any suitable number of tool holes 21 may be provided, and in the present instance six are shown. Any number of tools up to six and of different types, as required by the number, sequence and nature of the operations to be performed on different kinds of work pieces, may be mounted on the turret 13.

The turret 13 is adapted to be indexed periodically to locate the tools successively in operative alignment with the work. In the present instance, the working station for each of the tool holes 21 is at its lowermost point of revolution. The extent of each indexing step is dependent on the number of tool holes 21, and hence in the case of six such holes is 60°. The means for indexing the turret 13 is not shown since, per se, it forms no part of the present invention. One form of indexing mechanism is disclosed in my copending application, Serial No. 334,625, filed May 11, 1940.

After each indexing step, the turret 13 is reciprocated to move the particular tool in the working station through its cutting cycle which may comprise a rapid approach toward the work, a slow cutting feed through the work, and a rapid return to initial position.

The means for reciprocating the turret 13 comprises a hollow cam drum 22 mounted for rotation on a parallel axis within the frame 10. In its preferred form, the cam drum 22 is supported at one end for rotation in a depending bearing bracket 23 on the slide 12, and is provided with a continuous peripheral cam groove 24 of suitable configuration. The turret 13 is provided adjacent its inner end with a series of radially projecting cam followers or pins 25 which are adapted to be moved successively into cooperative engagement with the cam groove 24 as the drum is indexed step-by-step to locate the various tools singly in operative position. Each rotation of the cam drum 22 therefore serves to advance and retract the turret 13 in each indexed position.

Means is provided for automatically locking the turret 13 between indexing movements and for releasing the turret during each indexing movement. To this end, the turret 13 is formed with a series of longitudinal spline grooves 26 in its outer periphery corresponding in number and spacing to the tool holes 21. A locking bolt or plunger 27 is reciprocable in a bore 28 formed in a depending sleeve 29 on the turret slide 12 and opening therethrough radially to the guide bore 14. Rigid with the inner end of the plunger 27 is a spline key 30 adapted for selective sliding engagement with the spline grooves 26. A spline pin 31 engages a groove 32 in one side of the plunger 27 to constrain the latter against rotation, and thereby to maintain the key 30 parallel to the grooves 26 when released. The grooves 26 and the key 30 are complementary in form, and preferably are laterally tapered or wedge-shaped to locate the turret 13 accurately in position after each indexing movement. It will be understood that when the key 30 is in engagement with one of the grooves 26 it will permit the turret 18 to slide axially, the grooves being of sufficient length to accommodate the full tool stroke, but will lock the drum against rotation out of the indexed station.

The locking plunger 27 has an axial stem 33 which extends slidably through a bushing 34 in the outer end of the bore 28 for external actuation. A coil compression spring 35 encircling the stem 33 between the plunger head and the bushing 34 tends to urge the key 30 inwardly against the turret 13. The outer end of the stem 33 is formed in one side with a notch 36 receiving the free rounded end of one arm 37 of a bell crank lever 38 rotatable on a pin 39 on the adjacent bearing bracket 23. Another arm 40 of the lever 38 is provided with a cam roller 41 adapted for engagement by an arcuate wedge pull cam 42 rotatable with the drum 22 to withdraw the locking plunger 27 from the turret 13. The cam 42 is of such length and in such location on the cam drum 22 that the turret 13 will be released during each indexing movement and locked between successive indexing movements.

The locking plunger 27 may also be released manually at any time during the reciprocation of the turret 13. The means for this purpose comprises a lever 43 mounted intermediate its ends on a pin 44 supported between two spaced lugs 45 in the frame 10. The upper end of the lever 43 has a wide face 46 located for engagement with the free end of a depending arm 47 on the bell crank lever 38. This face extends longitudinally of the turret 13, and is of sufficient width to maintain operative relation with the arm 47 in all positions of the slide 12. The lower end of the lever 43 has an offset heel 48 adapted for engagement with a rotary cam or eccentric 49. A spring-pressed plunger 50 in the frame 10 acts on the lever 43 to urge the heel 48 constantly against the eccentric 49. The latter is fixed on a shaft 51 which is journaled in and extends through the front wall of the frame 10, and which is provided on the outer end with a suitable hand lever 52. Actuation of the hand lever 52 to rotate the throw of the eccentric 49 against the heel 48 will oscillate the lever 43 which through engagement with the arm 47 will rock the bell crank lever 38 to withdraw the locking plunger 27. Upon rotation of the low point of the eccentric 49 against the heel 48, the lever 43 will release the plunger 27 for return movement into engagement with the turret 13.

A suitable coolant is adapted to be supplied to each of the tools when indexed into operative position. Thus, the turret slide 12 is formed with a passage 53, one end of which is adapted to be connected through a conduit (not shown) to a suitable source of coolant supply, and the other end of which terminates in a port 54 open to the surface of the guide bore 14. The turret 13 is formed with a series of radial ports 55 opening from the periphery respectively to the sides of the tool holes 21, and movable successively into registration with the supply port 54 as the associated holes are indexed consecutively into the working station.

The supply of coolant is controlled by a valve 56 which is shut off during each tool indexing movement, and preferably whenever the locking plunger 27 is released either manually or automatically. In the present instance, the valve 56 comprises a bore 57 fully intersecting the passage 53, and a counterbore 58 opening to the side of the bore 28. A valve member 59 in the form of a pin is reciprocable in the bore 57 and has an enlarged peripheral collar 60 intermediate its ends guided in the counterbore 58. A coiled compression spring 61 is disposed about the pin 59 within the counterbore 58, and acts on the collar 60 in a direction to retract the valving end of the pin from the passage 53. The other end of the pin 59 is rounded, and projects into the bore 28 for engagement with an inclined cam face 62 defined by a notch in the side of the locking plunger 27.

Upon movement of the locking plunger 27 into position to lock the turret 13, the cam face 62 releases the valve member 59 for movement out of the passage 53 to permit the supply of coolant to the tool hole 21 in the working station. When the locking plunger 27 is retracted from the turret 13, either manually or automatically, the cam face 62 forces the valve member 59 into position to close the coolant supply passage 53. Consequently, the coolant is adapted to be automatically supplied when the tool is conditioned for operation and cut off when the tool is being indexed.

Each of the ports 54 is provided in the form of a longitudinal groove of such length that it will be in communication with the associated port 55 substantially throughout the range of reciprocation of the turret 13. It is preferable, however, that the port 55 move out of communication with the port 54 shortly before the turret 13 reaches its inoperative position on the return stroke. Consequently, no coolant is actually supplied to the tool hole 21 while the turret 13 is in retracted position even though it is properly indexed and locked. But coolant is supplied shortly after initiation of the forward stroke, and thereafter during the cycle until the turret 13 is again moved into retracted position. It will be noted that the port 55 opens to the rear end portion of the hole 21 so as not to be closed by the tool shank which is indicated in dot and dash lines at 63 in Fig. 2. The rear end of the hole 21 is closed by a removable plug 64 secured in position by a set screw 65 to prevent the escape of coolant into the turret 13. The coolant may be directed from the inner end of the hole 21 to the tool (not shown) in any suitable manner, as, for example, through an axial bore 66 in the shank.

I claim as my invention:

1. In a machine tool, in combination, a support having a guide bore, a turret mounted for rotation in said bore and having a plurality of peripherally spaced holes, means for rotatably indexing said turret to move said holes successively into a working station, said support being formed with a coolant supply port located at said station and opening to said bore, each of said holes being formed with a coolant inlet port movable into position for communication with said supply port respectively upon movement of the associated hole by rotation of said turret into said station, and valve means for controlling the supply of coolant to said supply port.

2. In a machine tool, in combination, a support having a guide bore, a turret mounted for rotation in said bore and having a plurality of peripherally spaced holes, means for rotatably indexing said turret to move said holes successively into a working station, said support being formed with a coolant supply port opening to said bore and each of said holes being formed with a coolant inlet port movable into position for communication with said supply port respectively upon movement of the associated hole by rotation of said turret into said station.

3. In a machine tool, in combination, a support having a guide bore, a turret mounted for rotation and for axial reciprocation recurrently out of and into an initial idle position in said bore and having a plurality of peripherally spaced holes, means for rotatably indexing said turret while in said idle position to move said holes successively into a working station, said support being formed with a coolant supply port, and each of said holes being formed with a coolant inlet port movable into communication respectively with said supply port when said hole is in said station and upon movement of said turret out of said idle position.

4. In a machine tool, in combination, a support, a turret mounted on said support for rotation and for axial reciprocation recurrently out of and into an idle position and having a plurality of peripherally spaced holes, means for rotatably indexing said turret upon each movement into said idle position to move said holes successively into a working station, and means automatically operable to establish a coolant supply connection to each hole when in said station and during reciprocation of said turret.

5. In a machine tool, in combination, a support having a guide bore, a turret mounted for rotation in said bore and having a plurality of peripherally spaced holes, means for rotatably indexing said turret to move said holes successively into a working station, said support being formed with a coolant supply port located at said station, each of said holes being formed with a coolant inlet port movable into position for communication with said supply port upon movement of the associated hole into said station, and valve means automatically operable in timed relation to the indexing of said turret to cut off the supply of coolant to said supply port during indexing movements of said turret and to permit the supply of coolant to said supply port when said turret is in indexed position.

6. In a machine tool, in combination, a support, a turret mounted on said support for rotation and for axial reciprocation and having a plurality of peripherally spaced holes, means for rotatably indexing said turret to move said holes successively into a working station, said support being formed with a coolant supply passage, each of said holes being formed with a coolant inlet movable into position for connection with said passage upon movement of the associated hole into said station, releasable means for automatically locking said turret against rotation between indexing movements and releasing said turret during each indexing movement, and valve means automatically operable in timed relation to said locking means to open said passage when said turret is locked and to close said passage when said locking means is released.

7. In a machine tool, in combination, a support, a turret mounted on said support for rotation and axial reciprocation and having a hole, means for rotatably indexing said turret to move said hole into a working station, said support being provided with a coolant supply passage and said hole having a coolant inlet movable into position for communication with said supply passage upon movement of said hole into said station, a releasable locking plunger normally spring urged into locking engagement with said turret to confine said hole in said station while permitting said reciprocation, and valve means controlled by said plunger to close said passage when said plunger is withdrawn from said turret and to open said passage when said plunger is in locking engagement with said turret.

8. In a machine tool, in combination, a support, a turret mounted on said support for rotation and axial reciprocation and having a hole, means for rotatably indexing said turret to move said hole into a working station, said support being provided with a coolant supply passage and said hole having a coolant inlet movable into position for communication with said supply passage upon movement of said hole into said station, a releasable locking plunger normally spring urged into locking engagement with said turret to confine said hole in said station while permitting said reciprocation, valve means controlled by said plunger to close said passage when said plunger is withdrawn from said turret and to open said passage when said plunger is in locking engagement with said turret, means automatically operable in timed relation to said first mentioned means to withdraw said plunger from said turret during indexing, and manual means available at any point in said reciprocation to withdraw said plunger from said turret.

9. In a machine tool, in combination, a support, a turret housing mounted on said support and having a guide bore, a turret mounted in said bore for axial reciprocation and for rotary indexing movements and having a plurality of parallel sockets arranged in uniformly spaced relation about the axis of rotation, drive means for reciprocating said turret in a recurring cycle including a forward stroke and a return stroke and for indexing said turret after each reciprocatory cycle to position said sockets successively in a working station for consecutive cycles, releasable means for locking said turret in indexed position, means for automatically controlling said locking means to release said turret for indexing movement at the end of each reciprocatory cycle and to lock said turret in position between said successive indexing movements, coolant supply means, and means operable in positive timed relation to said locking means to cut off said coolant supply means when said locking means is disengaged and to connect said coolant supply means to the socket located in said working station when said locking means is engaged.

10. In a machine tool, in combination, a support, a turret housing on said support and having a guide bore formed with a longitudinal groove, a turret mounted in said bore for axial reciprocation and for rotary indexing movements and having a plurality of parallel sockets arranged in uniformly spaced relation about the axis of rotation, drive means for reciprocating said turret in a recurring cycle including a forward stroke and a return stroke and for indexing said turret once for each reciprocatory cycle to position said sockets successively in a working station for successive cycles, releasable means for locking said turret in indexing position during each reciprocatory cycle, each of said sockets having a coolant inlet port opening from the periphery of said turret and being arranged for movement when in said working station into and out of communication with said groove respectively at the start of said forward stroke and at the end of said return stroke, and means for supplying coolant to said groove.

11. In a machine tool, in combination, a base, a slidable support on said base, a turret mounted on said support for rotation and for axial reciprocation and being formed in the periphery with a plurality of outwardly opening peripherally spaced longitudinal grooves, a plunger reciprocable in said support for selective engagement with any one of said grooves to lock said turret against rotation during reciprocation, spring means tending to urge said plunger toward said turret for engagement in the selected groove, a lever having one arm in operative engagement with said plunger for retracting said plunger from said turret against the action of said spring means and having a cam follower arm and having a manually operable arm, cam means operable to engage said cam follower arm to effect retraction of said plunger from said turret, and a manually operable lever mounted for engagement with said manually operable arm to retract said plunger from said turret at any point over a predetermined range of movement of said support on said base.

12. In a machine tool, in combination, a base, a slidable support on said base, a turret mounted on said support for rotation and for axial reciprocation and being formed in the periphery with a plurality of outwardly opening peripherally spaced longitudinal grooves, a plunger reciprocable in said support for selective engagement with any one of said grooves to lock said turret against rotation during reciprocation, spring means tending to urge said plunger toward said turret for engagement in the selected groove, a bell crank lever pivotally mounted in said support and having one arm operatively connected to said plunger, and a second lever pivotally mounted on said base and having a wide face disposed for engagement with the other arm of said first mentioned lever to actuate the latter to retract said plunger from said turret in different positions of said support.

13. In a machine tool, in combination, a support, a turret mounted on said support for axial reciprocation and for rotary indexing movement and having a plurality of sockets arranged in spaced relation about the axis of rotation, drive means for reciprocating said turret in a forward stroke out of idle position and a return stroke to idle position, said sockets being selectively movable into a working station, and means for supplying coolant to each socket when in said working station, said last mentioned means including a valve for cutting off the supply of coolant during the indexing movements of said turret, and a second valve for cutting off the supply of coolant when said turret is in said idle position, both valves being open during the reciprocation of said turret.

HARRY W. RUPPEL.